United States Patent
Leuthold et al.

(10) Patent No.: US 7,027,669 B2
(45) Date of Patent: Apr. 11, 2006

(54) METHODS AND APPARATUS FOR OPTICAL PULSE GENERATOR WITH PROGRESSIVE PHASE SHIFT

(75) Inventors: Juerg Leuthold, Eatontown, NJ (US); Xiang Liu, Marlboro, NJ (US); Xing Wei, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 214 days.

(21) Appl. No.: 10/641,414

(22) Filed: Aug. 15, 2003

(65) Prior Publication Data
US 2005/0036725 A1  Feb. 17, 2005

(51) Int. Cl.
*G02F 1/035* (2006.01)

(52) U.S. Cl. .................. 385/3; 385/1; 385/4; 359/279; 398/189

(58) Field of Classification Search ............... 385/1–5, 385/41–48; 359/180–189, 264, 279; 398/188, 398/189
See application file for complete search history.

(56) References Cited

U.S. PATENT DOCUMENTS 6,760,142 B1 * 7/2004 Leuthold et al. ............ 385/3 X

OTHER PUBLICATIONS

Hodzic et al., Alternative Modulation Formats in N×40 Gb/s WDM Standard Fiber RZ-Transmission Systems, Journal of Lightwave Technology, Apr. 2002, Page(s) 598-607, vol. 20, No. 4.

Idler et al., Vestigial Side Band Demultiplexing for Ultra High Capacity (0.64 bit/s/Hz) Transmission of 128×40 Gb/s Channels, Proc. Optical Fiber Communications Conference (OFC '01), paper MM3, 2001.

Veselka et al., Pulse Generaltion for Soliton Systems Using Lithium Niobate Modulators, IEEE Journal of Selected Topics in Quantum Electronics, Jun. 1996, Pages(s) 300-310, vol. 2, No. 2.

\* cited by examiner

*Primary Examiner*—Phan T. H. Palmer (57) ABSTRACT

Systems and techniques for generating optical pulses exhibiting a progressive phase shift, and the use of those pulses to transmit data, are described. One embodiment of the invention employs a Mach-Zehnder modulator using electrical signals chosen to introduce a predetermined frequency shift at the center of each pulse generated by the pulse generator. This frequency shift is achieved by introducing a timing difference between the electrical input signals. Another embodiment of the invention employs a chirp free pulse generator and a separate phase modulator to induce the desired frequency or phase shift. These progressively phase shifted pulses may be further modulated to transmit data by introducing phase or amplitude modulation on the optical pulses, depending on the data to be transmitted.

22 Claims, 10 Drawing Sheets

METHODS AND APPARATUS FOR OPTICAL PULSE GENERATOR WITH PROGRESSIVE PHASE SHIFT

FIELD OF THE INVENTION

The present invention relates generally to improvements in optical signal transmission. More particularly, the invention relates to advantageous systems and techniques for producing a series of pulses with a progressive phase shift.

BACKGROUND OF THE INVENTION

Return to zero optical signal sources are frequently used in optical communication. The return to zero format has been proven superior to the non return to zero format both in terms of receiver sensitivity and in terms of fiber transmission performance. One particularly useful way to implement a return to zero optical source is to generate a series of optical pulses. The optical pulses may suitably be subjected to modulation using a data signal, in order to use the pulses to carry data.

Various ways of modulating optical pulses exist. For example, the intensity of the pulses may be modulated, or the frequency or phase of the pulses may be modulated. Choices are also available with respect to the stage in the process of pulse generation at which modulation is to take place. Modulation may occur during the process of pulse generation, resulting in the generation of pulses that are modulated or encoded with data, or pulses may be generated that do not carry any data, and may then be subjected to a modulation process so that they will convey information.

Numerous encoding systems exist that may be used to encode or modulate optical signals. One most commonly used modulation technique is on-off keying (OOK), which encodes the binary information by turning an optical pulse on and off to represent digital "1" and "0", respectively. Another family of techniques that is particularly useful is phase modulation, in which information, such as binary bits, is encoded through the phase difference between succeeding pulses. Various modulation systems may be used, including differential phase shift keying (DPSK), of which $$\frac{\pi}{2} - DPSK$$

and minimum shift keying (MSK) are variants.

$$\frac{\pi}{2} - DPSK$$

and MSK systems represent bits by phase differences of $$\frac{\pi}{2} \text{ and } -\frac{\pi}{2}$$

between adjacent pulses. For example, a "0" may be represented by a phase difference of $$\frac{\pi}{2}$$

and a "1" may be represented by a phase difference of $$-\frac{\pi}{2}.$$

An additional technique that has been studied primarily in connection with OOK modulation is vestigial sideband (VSB) filtering. VSB filtering employs an optical filter with the center of its passband detuned either up or down by a predetermined amount in order to filter the optical signal and thereby reduce its bandwidth. The amount of detuning may suitably be approximately 10 GHz in cases where the desired bit rate is 40 Gb/s.

It has also been found that $$\frac{\pi}{2} - DPSK,$$

including MSK, is analogous to DPSK with VSB filtering. Vestigial sideband filtering has drawn considerable interest, but it is difficult to implement under real world conditions. The reason for this difficulty is that the use of vestigial sideband filtering according to prior art techniques has required precise optical filtering. The filter center frequency, or wavelength, and the filter shape used in prior art implementations of VSB, are critical and difficult to achieve reliably. Therefore, in the prior art, VSB has frequently proven to be an interesting but impractical technique.

It is often convenient to employ electrically controlled devices for generating optical signals such as pulse streams. Such devices receive an optical signal as an input, as well as one or more electrical signals to influence the optical signal in order to produce an optical output having desired characteristics. The use of electrical control signals often provides a relatively simple and inexpensive way to produce the desired characteristics. Optical techniques, such as optical filtering, are frequently more complex and more difficult to control and more costly than electrical techniques.

There exists, therefore, a need for systems and techniques for producing an optical pulse stream using electrical control methods to provide desired characteristics of the pulse stream, with the pulse stream exhibiting desired phase characteristics, including phase characteristics that allow for the use of the pulse stream in both OOK and DPSK systems to achieve desired effects similar to that of optical vestigial sideband filtering.

SUMMARY OF THE INVENTION

An optical pulse generator according to one embodiment of the present invention comprises a Mach-Zehnder modulator (MZM) whose optical input is a continuous wave (CW) laser. A Mach-Zehnder modulator receives an optical signal and splits the signal along two optical waveguides. Two sinusoidal electrical signals are provided as the electrical inputs to the pulse generator, suitably through electrodes affixed to or incorporated in the two waveguides. The electrical voltage applied to a waveguide changes the refractive index of the waveguide. The two electrical signals are chosen to introduce a fixed relative phase shift or time delay between the optical signals traveling in the waveguides. The two waveguides are brought together so that the two optical signals are coherently combined and carried along a single waveguide to the output of the pulse generator. When the optical signals are combined, they produce either constructive or destructive interference, so that the combined optical signal is intensity modulated. If the refractive indices of the waveguides are properly controlled with the DC bias voltage, the intensity modulation causes the optical signal to manifest itself as a stream of pulses. Because the input electrical signals are simply sine waves, the pulses by themselves do not carry any data, and another modulator may be used to encode data on the pulse stream.

One particularly useful feature of the pulse generator embodying the present invention is its use of electrical signals chosen to introduce a predetermined frequency shift on each optical pulse generated by the pulse generator. This frequency shift is achieved by introducing a predetermined timing difference between the two input electrical signals. Each electrical signal affects the phase of the optical signal traveling down the parallel waveguide to which the electrical signal is applied. The phase shifts generated by the electrical signals affect the phase or frequency of the pulses that result when the light beams traveling in the two arms meet and interfere.

Proper selection of the electrical signals, and of the timing skew between the electrical signals, is important to produce desired frequency shifts for the pulses. Because of the frequency shift, the pulses exhibit a progressive phase shift when viewed with the center frequency of the pulses as the new reference frequency. Various progressive phase shifts are possible, but of particular interest is a progressive $$\frac{\pi}{2}$$

phase shift. That is, the phase shift between adjacent pulses may successively be $$-\frac{\pi}{2}, 0, \frac{\pi}{2}, \pi, \frac{3\pi}{2}, 2\pi,$$

and so on. It will be recognized that such a progressive phase shift can be simplified to a repeating cycle of $$-\frac{\pi}{2}, 0, \frac{\pi}{2}$$

and π. Pulses exhibiting such a phase shift can be modulated using differential phase shift keying to produce $$\frac{\pi}{2} DPSK$$

modulation. Alternatively, the pulses may be modulated using on-off keying to produce the equivalent of a vestigial sideband OOK signal.

A more complete understanding of the present invention, as well as further features and advantages of the invention, will be apparent from the following Detailed Description and the accompanying drawings.

BRIEF DESCRIPTION OF THE DRAWINGS

FIG. 5 illustrates a $$\frac{\pi}{2} DPSK$$

transmitter according to an aspect of the present invention;

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
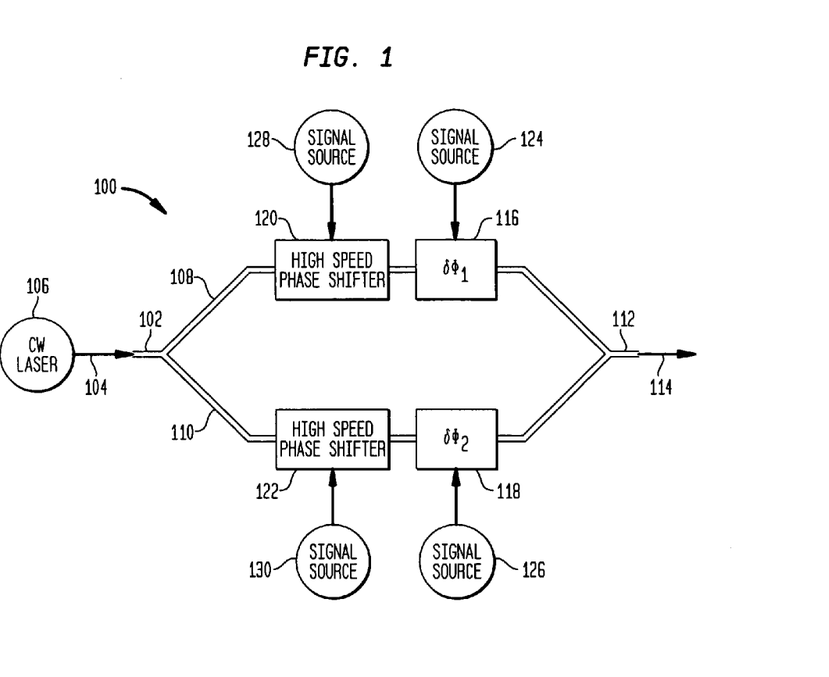
FIG. 1 illustrates a pulse generator according to an aspect of the present invention.

FIG. 1 illustrates a pulse generator 100 according to an aspect of the present invention. The pulse generator 100 employs a dual drive Mach-Zehnder modulator (MZM), which includes an input waveguide 102, that suitably receives an optical signal 104 from an optical source 106. The optical source 106 may suitably be a continuous wave (CW) laser. The frequency of the laser, which will be referred to herein as $$\frac{\omega}{2\pi},$$

is typically approximately 193 terahertz (THz) for optical fiber communication, and the corresponding wavelength is approximately 1550 nm. If the optical source 106 is a CW laser as described above, the field of the light signal from the laser can be described as $$E_0 = A \exp(-i\omega t) + \text{c.c.}, \qquad (1)$$

where A is the amplitude of the monochromatic wave, $\omega$ is the angular frequency, and c.c. stands for complex conjugate.

The input waveguide 102 divides into first and second parallel waveguides 108 and 110, respectively. The parallel waveguides 108 and 110 then combine into an output waveguide 112 that produces an optical output 114. The optical output 114 is the output of the pulse generator 100.

The pulse generator 100 includes at least one low speed phase shifter 116 and preferably a second low speed phase shifter 118, as well as two high speed phase shifters 120 and 122. The low speed phase shifters 116 and 118 are suitably controlled by electrical signal sources 124 and 126, respectively. The electrical signal sources 124 and 126 suitably provide input voltages chosen to create a desired phase difference between the optical signals traveling in the waveguides 108 and 110. The phase shift provided by the first low speed phase shifter 116 is referred to herein as $\delta\phi_1$ and the phase shift provided by the second low speed phase shifter 118 is referred to as $\delta\phi_2$. Considerations relating to the choice of values of $\delta\phi_1$ and $\delta\phi_2$ will be described below.

The high speed phase shifters 120 and 122 are controlled by electrical signal sources 128 and 130, respectively. The electrical signal sources 128 and 130 suitably produce signals in the form of sine waves, with a frequency chosen according to the desired pulse periods. In one presently preferred embodiment, the signal source 128 supplies a signal proportional to $$\cos\left(\Omega\left(t + \frac{\tau}{2}\right)\right),$$

and the signal source 130 supplies a signal proportional to $$-\cos\left(\Omega\left(t - \frac{\tau}{2}\right)\right).$$

The value of $\Omega$ is based on the desired pulse period and follows the relationship $$\frac{\Omega}{2\pi} = \frac{1}{T},$$

where T is the pulse period. For example, if the pulse repetition rate is 40 GHz, the pulse period T=25 picoseconds. The value $\tau$ represents a relative time skew between the two input electrical signals. A time skew $\tau=0$ corresponds to the push-pull differential drive configuration of the MZM 100.

In the following mathematical description, the modulation depth, or the peak-to-peak phase shift induced by each of the high speed phase shifters 128 and 130, is referred to as $\Delta\phi_{p-p}$. The field of the optical signal traveling through the waveguide 108 is described as follows:

$$E_1 = \frac{A}{\sqrt{2}} \exp\left[-i\omega t + i\frac{\Delta\phi_{p-p}}{2}\cos\left(\Omega\left(t + \frac{\tau}{2}\right)\right) + i\delta\phi_1\right] + \text{c.c.} \qquad (2)$$

$$= \frac{A}{\sqrt{2}} \exp\left[-i\omega t + i\frac{\Delta\phi_{p-p}}{2}\cos\frac{\Omega\tau}{2}\cos\Omega t - i\frac{\Delta\phi_{p-p}}{2}\sin\frac{\Omega\tau}{2}\sin\Omega t + i\delta\phi_1\right] + \text{c.c.}$$

where A, $\omega$, $\Delta\phi_{p-p}$, $\Omega$, $\tau$, $\delta\phi_1$ are all described above.

By adjusting $\Delta\phi_{p-p}$ and $\delta\phi_1$ such that $$\Delta\phi_{p-p} = \frac{\pi}{2\cos\frac{\Omega\tau}{2}} \qquad (3)$$

and $$\delta\phi_1 = 2N\pi - \frac{\pi}{4} \qquad (4)$$

where N is an arbitrary integer, the expression of $E_1$ can be rewritten as:

$$E_1 = \frac{A}{\sqrt{2}} \exp\left[-i\omega t - i\frac{\pi\tan\frac{\Omega\tau}{2}}{4}\sin\Omega t + i\frac{\pi}{4}(\cos\Omega t - 1)\right] + \text{c.c.} \qquad (5)$$

Similarly, the electrical field of the signal in the other waveguide 110 can be given as follows:

$$E_2 = \frac{A}{\sqrt{2}} \exp\left[-i\omega t - i\frac{\Delta\phi_{p-p}}{2}\cos\left(\Omega\left(t - \frac{\tau}{2}\right)\right) + i\delta\phi_2\right] + \text{c.c.} \qquad (6)$$

$$= \frac{A}{\sqrt{2}} \exp\left[-i\omega t - i\frac{\Delta\phi_{p-p}}{2}\cos\frac{\Omega\tau}{2}\cos\Omega t - i\frac{\Delta\phi_{p-p}}{2}\sin\frac{\Omega\tau}{2}\sin\Omega t + i\delta\phi_2\right] + \text{c.c.}$$

and the use of $$\delta\phi_2 = 2N\pi + \frac{\pi}{4}$$

for the bias control of the waveguide 110 yields $$E_2 = \frac{A}{\sqrt{2}} \exp\left[-i\omega t - i\frac{\pi\tan\frac{\Omega\tau}{2}}{4}\sin\Omega t - i\frac{\pi}{4}(\cos\Omega t - 1)\right] + \text{c.c.} \qquad (7)$$

The field produced by the signal in the output waveguide 112 can be obtained by coherently combining $E_1$ and $E_2$ to generate the output field $$E_{out} = \quad (8)$$

$$\frac{E_1 + E_1}{\sqrt{2}} = A\cos\left[\frac{\pi}{4}(\cos\Omega t - 1)\right]\exp\left[-i\omega t - i\frac{\pi\tan\frac{\Omega\tau}{2}}{4}\sin(\Omega t)\right] + c.c.$$

In equation (8), the cosine function represents the magnitude of the output signal, which is a pulse train with a pulse period of $$T = \frac{2\pi}{\Omega}$$

and a duty cycle of 50%.

Figure 2A:
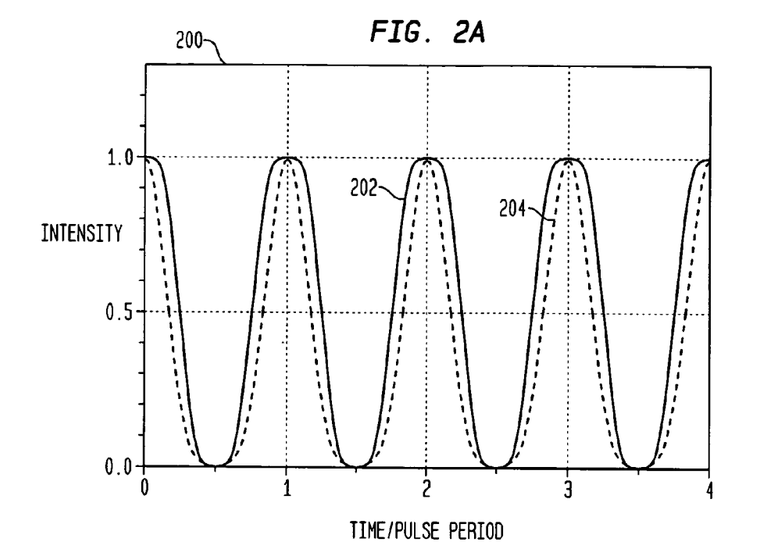
FIGS. 2A–2C are graphs showing various characteristics of pulses produced by a pulse generator according to an aspect of the present invention.

FIG. 2A shows a graph 200 illustrating an intensity curve 202 of an optical output signal produced by a pulse generator according to an aspect of the present invention, and an intensity curve 204 of an optical output signal produced by a pulse generator according to an alternative aspect of the present invention. The curve 202 shows characteristics of a pulse train produced by a pulse generator such as the pulse generator 100 of FIG. 1. The intensity is the square of the amplitude, and the peaks of the optical pulses are located at t=NT. The curve 204 is discussed in additional detail below in connection with the discussion of FIG. 4.

The exponential function in equation (8) reveals the phase of the optical signal, which is as follows:

$$\phi(t) = -\frac{\pi\tan\frac{\Omega\tau}{2}}{4}\sin(\Omega t). \quad (9)$$

Figure 2B:
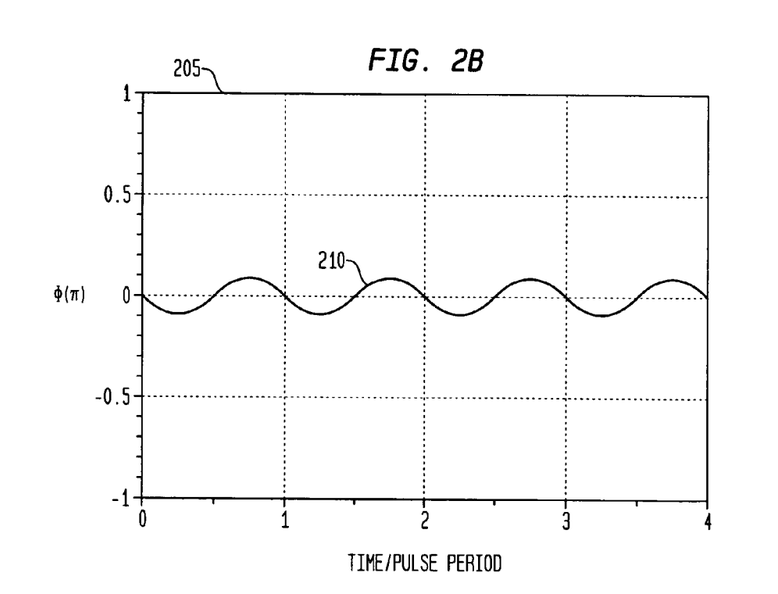

FIG. 2B shows a graph 205, of a curve 210 illustrating the phase evolution of the optical signal. It is notable that at the center of each pulse, there is a substantially instantaneous frequency shift:

$$\Delta\omega = \frac{\partial\phi(t)}{\partial t}\bigg|_{t=2N\pi} = \frac{\pi}{4}\Omega\tan\frac{\Omega\tau}{2}. \quad (10)$$

If a new frequency reference is chosen as follows:

$$\omega' = \omega + \Delta\omega = \omega + \frac{\pi}{4}\Omega\tan\frac{\Omega\tau}{2}, \quad (11)$$

equation (8) above can be rewritten in the following form:

$$E_{out} = A\cos\left[\frac{\pi}{4}(\cos\Omega t - 1)\right]\exp[-i\omega' t + i\phi'(t)] + c.c. \quad (12)$$

where the phase φ'(t) with respect to the new frequency reference is $$\phi'(t) = \left(\frac{\pi}{4}\Omega\tan\frac{\Omega\tau}{2}\right)t - \frac{\pi\tan\frac{\Omega\tau}{2}}{4}\sin(\Omega t). \quad (13)$$

Figure 2C:
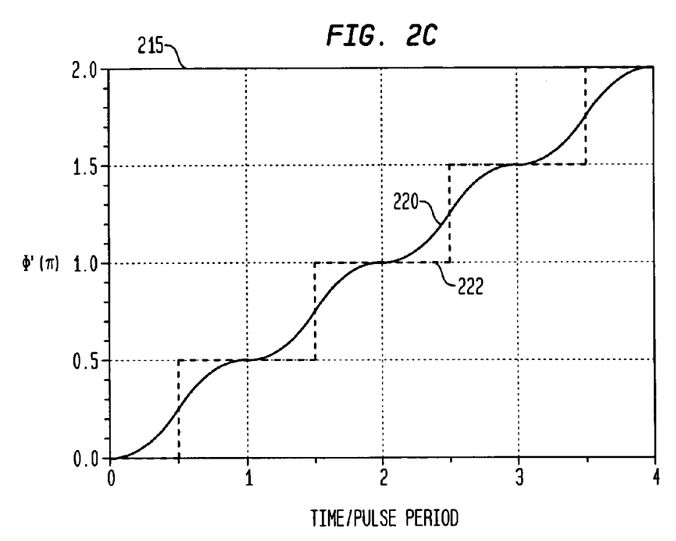

FIG. 2C is a graph 215 showing curves 220 and 222, which illustrate phase characteristics of the pulses with respect to this new frequency reference. The new phase φ'(t) is shown by the curve 220 of FIG. 2C. It will be noted that at the center of each light pulse, the phase curve φ'(t) has zero slope and can be well approximated by the dashed curve 222 of FIG. 2C, which is a stair function with a constant phase increment for each light pulse. Such an optical pulse source with a constant phase increment between two successive pulses will be referred to as a progressive phase shift (PPS) pulse source.

One kind of PPS pulse generator that is particularly useful is one producing pulses having a phase increment of $$\frac{\pi}{2}$$

This desired phase increment can be achieved if the frequency shift $$\frac{\Delta\omega}{2\pi} = \frac{1}{4T}.$$

In that case, every pair of adjacent pulses will appear to have a phase shift of $$\Delta\omega T = \frac{\pi}{2}.$$

The timing skew required to achieve this progressive phase shift can be calculated from equation (10). Using $$\Delta\omega = \frac{\pi}{2T}$$

yields the value $$\tan\frac{\Omega\tau}{2} = \frac{1}{\pi}, \text{ or } \frac{\Omega\tau}{2} = \tan^{-1}\left(\frac{1}{\pi}\right) \approx 0.308.$$

Therefore, the timing skew τ is given by $$\tau \approx \frac{2*0.308}{\Omega} = \frac{2*0.308*T}{2\pi} \approx 0.10T.$$

Furthermore, a suitable phase modulation depth $$\Delta\phi_{p-p} = \frac{\pi}{2\cos\frac{\Omega\tau}{2}} \approx 0.525\pi$$

can be calculated using equation (3). These parameters have been used to produce the curves 202, 210, and 220 of FIGS. 2A–2C.

Figure 3:
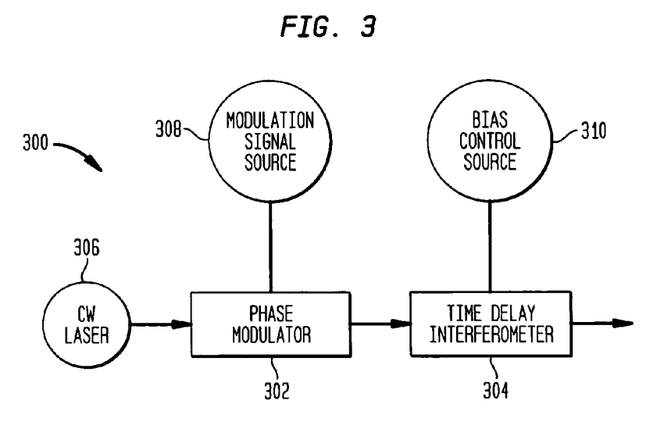
FIG. 3 illustrates a pulse generator according to an alternative aspect of the present invention.

The concepts presented in the above described embodiment of the invention can be extended to develop alternative embodiments of the invention. FIG. 3 illustrates one such pulse generator 300. The pulse generator 300 does not employ an MZM, but instead comprises a phase modulator 302 followed by an optical delay interferometer 304. The phase modulator 302 is supplied by a CW laser 306 and driven by a phase modulation signal source 308, to produce a phase modulation with the modulation depth $\Delta\phi_{p-p}$ described above. The phase modulated signal produced by the phase modulator 302 is supplied as an input to the optical delay interferometer, which in the present embodiment imposes a time delay of $$\frac{T}{2} - \tau$$

on its input signal, suitably under the control of a bias control source 310. Such a configuration, with the modulation depth and time delay described above, produces a series of progressively phase shifted pulses similar to those produced by the pulse generator 100 of FIG. 1. It has been shown in the application "Delay Interferometer Optical Pulse Generator", Leuthold 9-8-3, U.S. patent application Ser. No. 10/144,477, filed May 13, 2002, assigned to a common assignee with the present invention and incorporated herein by reference in its entirety, that phase modulation of an optical signal followed by the operation of an optical delay interferometer is mathematically equivalent to the effect of an MZM pulse generator. Therefore, application of phase modulation and time delay in accordance with the teachings of the present invention will produce progressively phase shifted pulses from such a configuration, in the same way that application of phase modulation and time delay in accordance with the teachings of the present invention will produce progressively phase shifted pulses from an MZM configuration.

Figure 4:
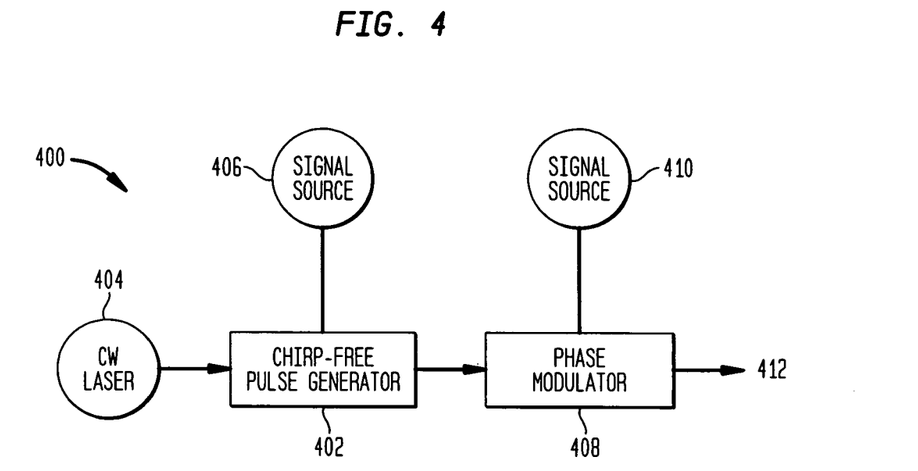
FIG. 4 illustrates a pulse generator according to a further alternative aspect of the present invention.

A further alternative aspect of the invention involves the use of a chirp free pulse generator followed by a phase modulator. FIG. 4 illustrates a phase modulated pulse generator 400 according to this alternative aspect. The phase modulated pulse generator 400 comprises a chirp free pulse generator 402 that receives an optical signal from a CW laser 404 and is controlled by an electrical input signal source 406 in order to generate chirp free pulses. These pulses preferably have a duty cycle of approximately one third or 33%, similar to the pulses shown by the dashed curve 204 of FIG. 2A. In order to produce pulses having these characteristics, the chirp free pulse generator 402 may suitably be an MZM, and the electrical signal produced by the signal source 406 may be used to differentially drive the chirp free pulse generator 402 with a sinusoidal driver signal having a frequency equal to one half the desired pulse rate.

The output of the chirp free pulse generator 402 is then supplied to a phase modulator 308, controlled by a phase modulation signal source 410. The phase modulator 408 induces a phase modulation on a stream of optical pulses. The optical pulses may suitably have characteristics similar to those illustrated in FIG. 2B. The phase modulation produced by the electrical input signal 410 produces, as an output 412 of the phase modulator 408, a pulse train having a duty cycle of approximately 33% and exhibiting a progressive phase shift of approximately $$\frac{\pi}{2}.$$

If desired, a smaller duty cycle may be used to reduce the effect of chirp. This chirp is caused by the non-ideal phase of the pulse train produced by the modulator 408. The non-ideal phase can be seen by contrasting the phase curve 220 in FIG. 2C with the dashed curve 222, the dashed curve 222 being the ideal phase for chirp free pulses. Using a smaller duty cycle reduces the effect of chirp because the pulse energy is more concentrated in the center of the pulse period.

A $$\frac{\pi}{2} - PPS$$

pulse generator such as the pulse generator 100 may advantageously be employed in series with a modulator such as a differential phase shift keying (DPSK) modulator or an on-off keying (OOK) modulator. The stream of pulses produced by the pulse generator serves as an optical input to the data modulator. The modulator then modulates the optical signal in either its phase or its amplitude using an electrical data signal. Depending on the particular choices made for the operation of the pulse generator and the particular modulator used, a number of particularly useful encoding techniques are possible.

Figure 5:
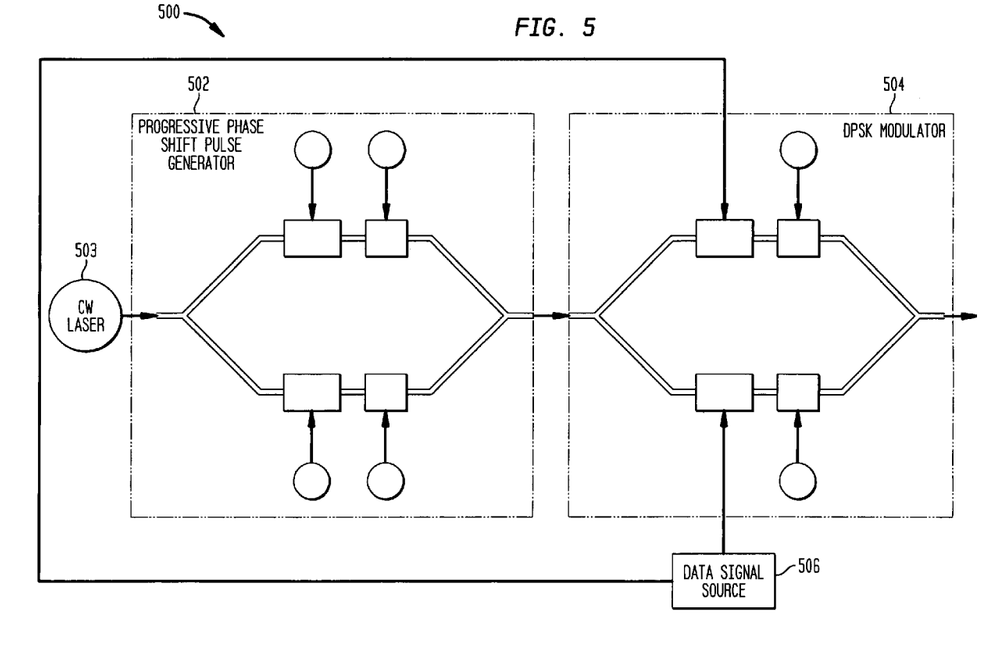

FIG. 5 illustrates a transmitter 500 according to an aspect of the present invention. The transmitter 500 includes a PPS pulse generator 502, similar to the pulse generator 100, configured to produce a progressive phase shift of $$\frac{\pi}{2}.$$

The transmitter 500 is suitably supplied by a CW laser 503. The transmitter 500 includes a modulator 504, suitably implemented as a Mach-Zehnder modulator. The modulator 504 is suitably driven by a data signal source 506, which supplies the modulator 504 with electrical signals encoding data using DPSK, such that the modulator 504 encodes a bit as a phase shift between adjacent pulses of 0 or π, depending on the identity of the bit. That is, the modulator 504 may encode a "0" as a pulse with the same phase as the previous pulse, and may encode a "1" as a pulse with a π phase shift with respect to the previous pulse.

The modulator 504 adds a phase shift of 0 or π to the signal it receives. If the input to the modulator 504 has a constant phase, the output of the modulator 504 will be pulses having a phase shift of 0 or π between pulses. However, in the arrangement illustrated in FIG. 5, the modulator 504 receives as an optical input a pulse stream with a progressive phase shift of $$\frac{\pi}{2}$$

between pulses, produced by the pulse generator 502. The modulator 504 imposes a phase shift of 0 or π on this pulse stream, resulting in an optical signal wherein data is represented by phase shifts of $$\frac{\pi}{2} \text{ and } \frac{\pi}{2}$$

for "0" and "1", respectively. Such a modulation technique is referred to as π/2-DPSK.

The data transmission accomplished by a transmitter such as the transmitter 500 of FIG. 5 can be better understood by considering the modulation of an exemplary data stream 0111010 to illustrate the phase modulation process, with the successive values of the data stream 0111010 and the various characteristics of the pulse streams used to modulate the data stream laid out in the following table.

| Data: | 0 | 1 | 1 | 1 | 0 | 1 | 0 |
|---|---|---|---|---|---|---|---|
| DPSK driver signal: | 0 | 0 | 1 | 0 | 1 | 1 | 0 | 0 |
| Phase of DPSK: | 0 | 0 | π | 0 | π | π | 0 | 0 |
| π/2-progressive phase | 0 | π/2 | π | 3π/2 | 0 | π/2 | π | 3π/2 |
| Phase of π/2-DPSK | 0 | π/2 | 0 | 3π/2 | π | 3π/2 | π | 3π/2 |

The electrical driver signal that controls the DPSK data modulator is differentially encoded from the original data to be transmitted, as can be seen in the example in the table above. This driver signal directly controls the phase imposed by the DPSK data modulator 504. The addition of the phase imposed by the DPSK modulator 504 and the phase from the π/2-PPS pulse generator 502 yields the last row in the table, which shows the values for the phase of the π/2-DPSK signal that forms the output of the transmitter 500.

Figure 6:
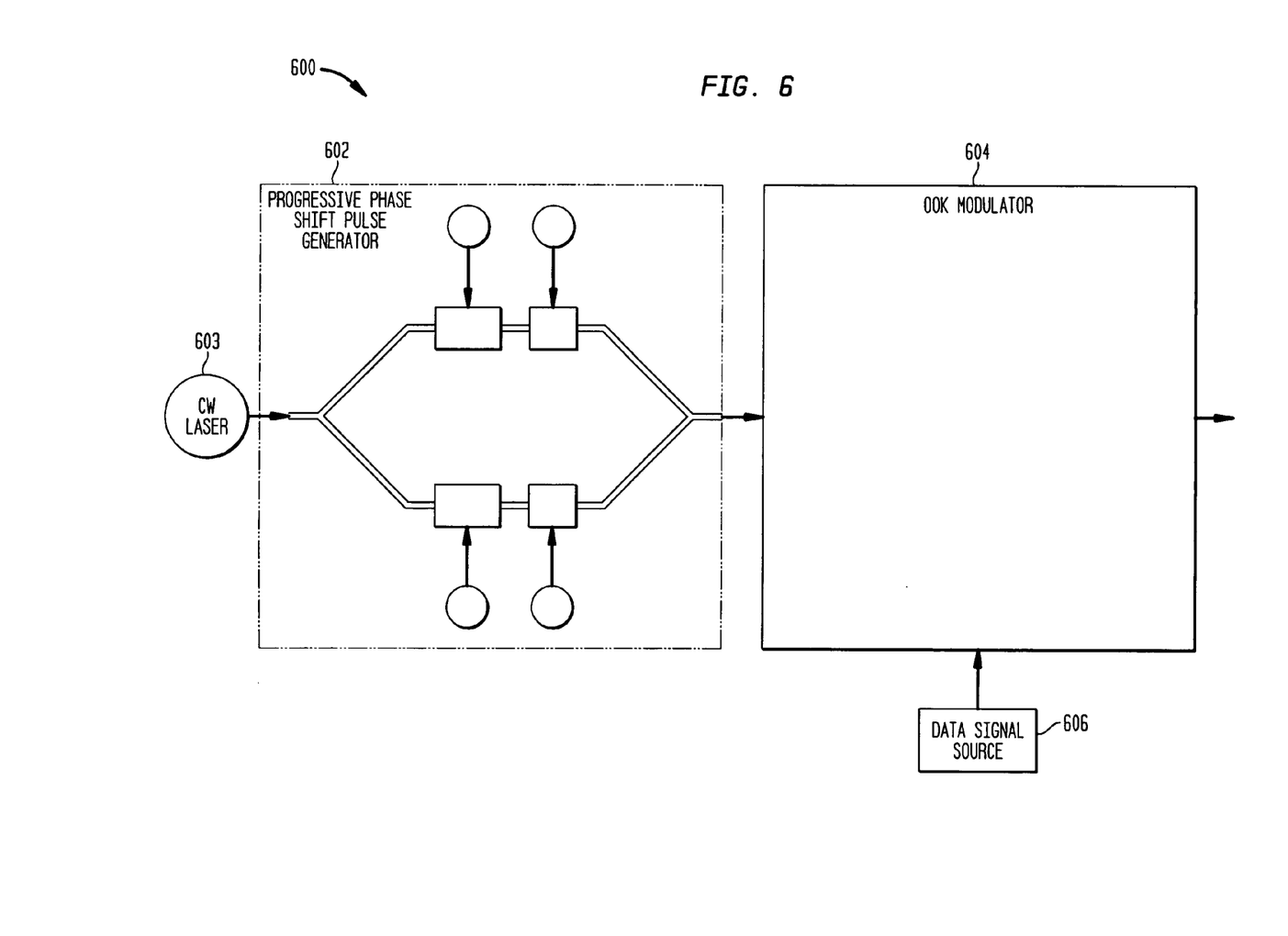
FIG. 6 illustrates a vestigial sideband transmitter according to an aspect of the present invention.

FIG. 6 illustrates a transmitter 600 according to an alternative embodiment of the present invention. The transmitter 600 includes a pulse generator 602 similar to the pulse generator 502 of FIG. 5. The transmitter 600 is suitably supplied by a CW laser 603. The transmitter 600 also includes an on-off keying modulator 604. The on-off keying modulator 604 passes or blocks the signal produced by the pulse generator 602, depending on the data to be transmitted. The modulator 604 is suitably driven by an electrical data signal supplied by a data signal source 606. Upon recognizing a "zero" in the data signal, the modulator 604 may block the optical signal received from the pulse generator 602, while recognition of a "one" in the data signal may cause the modulator 604 to pass the optical signal. The data modulator 604 is preferably chirp free. That is, when passing the optical signal, the data modulator 604 does not impose chirp on the signal.

Applying the on-off keying of the modulator 604 to the progressively phase shifted pulses produced by the pulse generator 602 generates a signal that is equivalent to a VSB signal. A VSB signal includes asymmetric carrier tones in the optical power spectrum, and it is known to be robust against strong optical filtering. Prior art of VSB makes use of optical filters that are intentionally detuned from the laser frequency to filter the optical signal. The use of the on-off keying modulator 604 with the π/2 progressively phase shifted pulses achieves the filtering effect electronically.

The modulation process accomplished by a transmitter such as the transmitter 600 can be better understood by considering the modulation of an exemplary data stream 01110100. The successive values of the data stream 0111010 and the various pulse streams used to modulate the data stream are laid out in the following table. The intensity of the data-encoded optical signal is controlled by the data modulator 604, while the phase of the pulses is determined by the π/2-PPS pulse generator 602. The amplitude and phase of the output signal are represented in the complex form with "i" representing an imaginary number $\sqrt{-1}$.

| Data: | 0 | 1 | 1 | 1 | 0 | 1 | 0 | 0 |
|---|---|---|---|---|---|---|---|---|
| Amplitude of OOK: | 0 | 1 | 1 | 1 | 0 | 1 | 0 | 0 |
| π/2-progressive phase | 0 | π/2 | π | 3π/2 | 0 | π/2 | π | 3π/2 |
| Complex amplitude | 0 | i | −1 | −i | 0 | i | 0 | 0 |

Figure 7A:
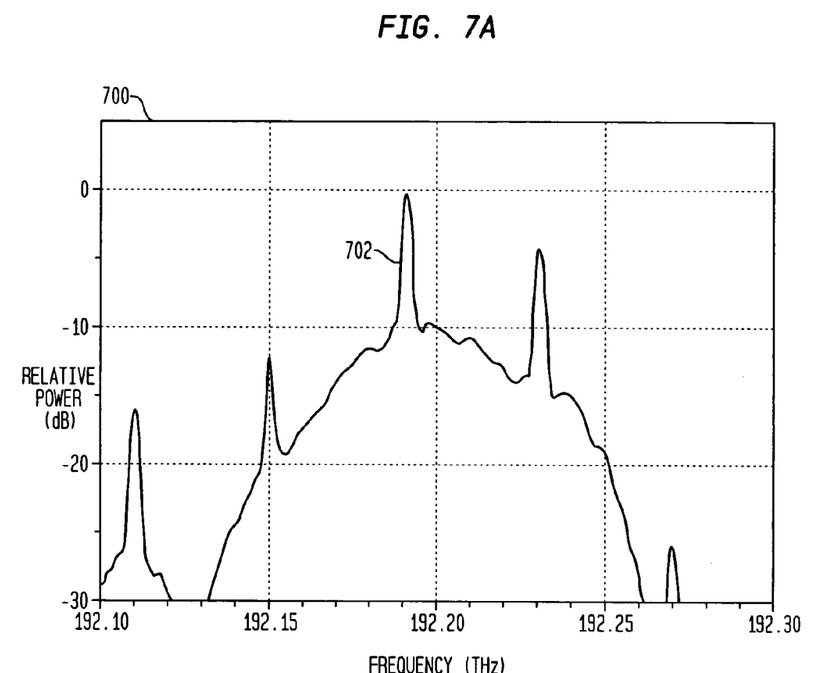
FIGS. 7A and 7B illustrate a measured power spectrum and an eye diagram of a VSB signal generated using the VSB transmitter of FIG. 6.
Figure 7B:
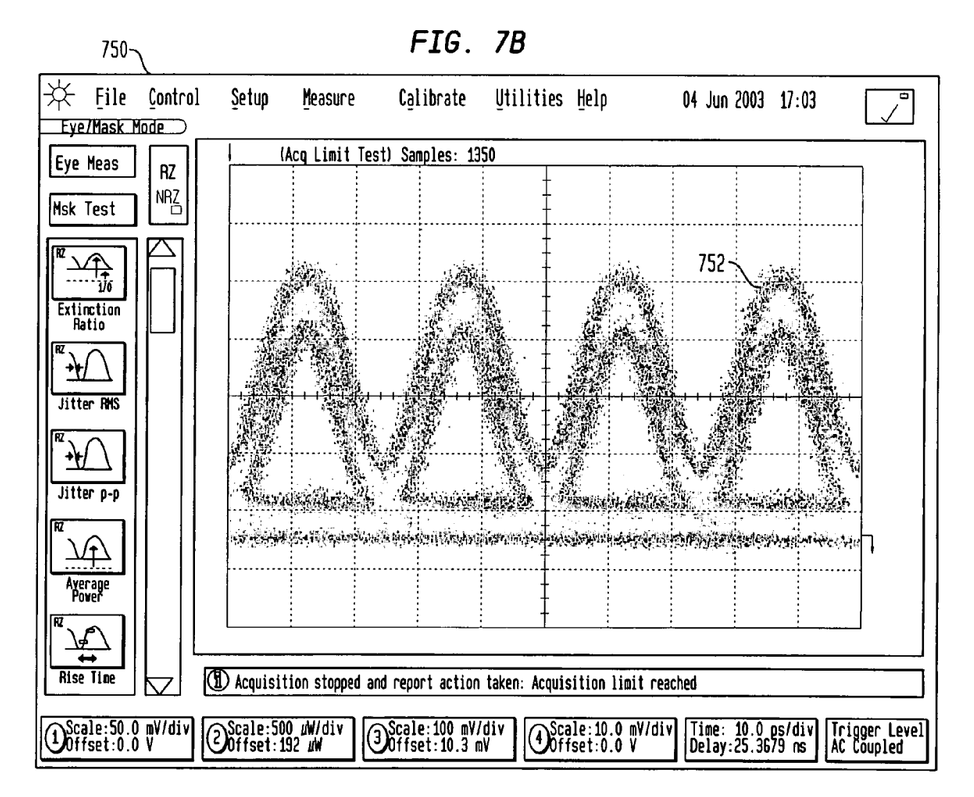

An experiment was carried out to test a VSB similar to the transmitter 600 of FIG. 6. The laser used for this experiment had a frequency of 192.190 THz, which was intentionally detuned by 10 GHz from the standard International Telecommunications Union (ITU) grid frequency 192.200 THz. Using the VSB transmitter according to the present invention, the center frequency of the data-encoded optical signal was effectively shifted to 192.200 THz. FIG. 7A shows a graph 700 of the optical power spectrum of the output of the transmitter, illustrated by a curve 702 of power plotted against frequency. The curve 702 shows the asymmetric carrier tones characterizing the output. FIG. 7B illustrates an oscilloscope display 750, presenting an eye diagram 752 of the VSB signal produced by the transmitter.

Figure 8:
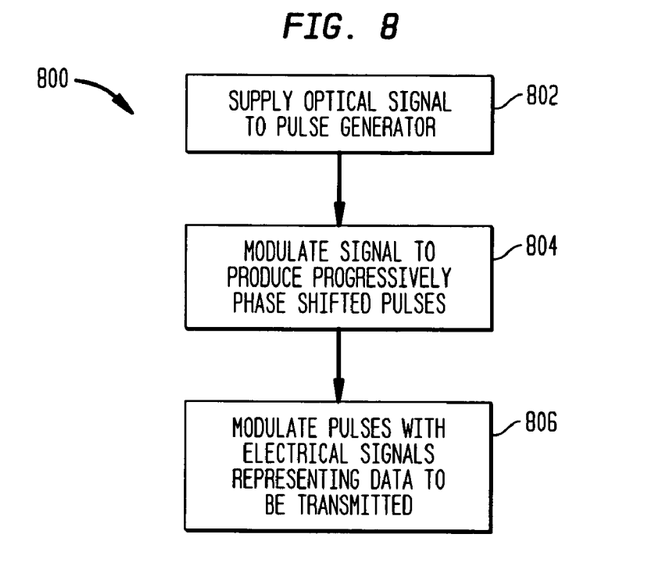
FIG. 8 illustrates a process of optical data transmission according to an aspect of the present invention.

FIG. 8 illustrates a process of pulse generation and data transmission 800 according to an aspect of the present invention. At step 802, an optical signal is supplied to an optical input of a pulse generator. The optical input is suitably provided by a continuous wave laser. At step 804, the signals traveling in the waveguides are modulated to produce a progressive phase shift between successive pulses. This modulation may suitably comprise a combination of phase modulation and frequency shift, with various alternative techniques to achieve the desired progressive phase shift being discussed in additional detail below. The modulation may suitably be performed so as to achieve a progressive phase shift of $$\frac{\pi}{2}.$$

At step 806, the pulses produced by the pulse generator are suitably modulated with electrical signals representing binary data to be transmitted. The electrical signals may suitably represent the data in the form of differential phase shift keying, in which case the modulation of pulses having a progressive phase shift of produces $$\frac{\pi}{2}$$

$$\frac{\pi}{2}$$

DPSK pulses. Such pulses represent binary data by a phase shift between adjacent pulses of no more than $$\frac{\pi}{2}.$$

Alternatively, the electrical signals may be applied so as to perform on-off keying modulation on the progressively phase shifted pulses, in order to produce a data output exhibiting vestigial sideband modulation.

Figure 9:
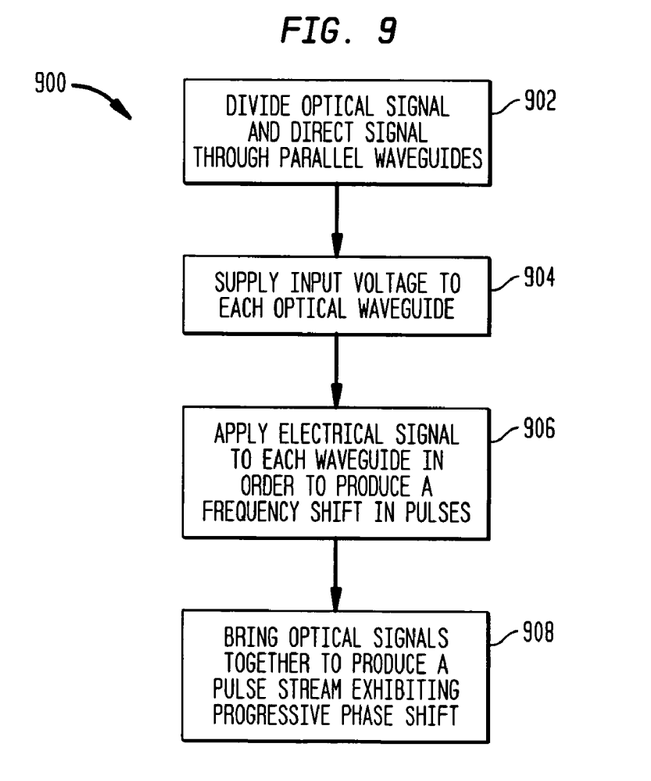
FIG. 9 illustrates a process of pulse generation according to an aspect of the present invention.

FIG. 9 illustrates a process 900 of progressive phase shift pulse generation, according to an aspect of the present invention. The process 900 may suitably be employed to accomplish the pulse generation achieved in the step 804 of the process 800 discussed above. At step 902, the optical signal is divided so as to travel through parallel waveguides. At step 904, an input voltage is supplied to each of the parallel waveguides in order to produce a desired relative phase difference between the signals traveling through the waveguides. At step 906, an electrical signal is supplied to each of the waveguides, with the two electrical signals exhibiting a relative timing skew chosen to produce a predetermined frequency shift in pulses to be produced by the pulse generator. The timing skew is based on the period of the pulses to be produced by the pulse generator and is chosen so as to produce a progressive phase shift. The timing skew is based on the desired pulse period and on the frequency of the optical signal source. At step 908, the parallel optical signals are brought together to produce a pulse generator output exhibiting a progressive phase shift based on the modulation achieved by the electrical signals.

Figure 10:
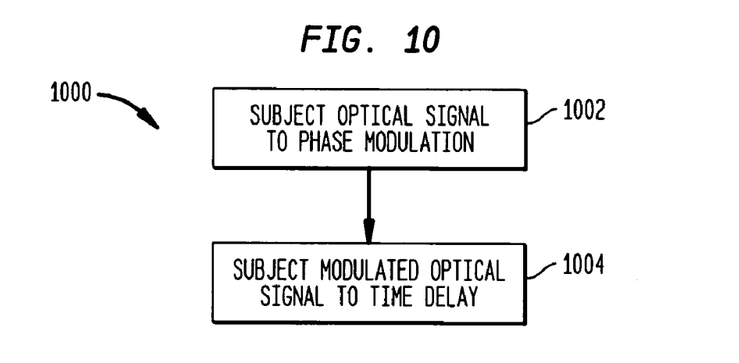
FIG. 10 illustrates an alternative process of pulse generation according to an alternative aspect of the present invention.

FIG. 10 illustrates a process 1000 of progressive phase shift pulse generation, according to an aspect of the present invention. The process 1000 may suitably be employed to accomplish the pulse generation achieved at step 804 of the process 800 discussed above. At step 1002, the optical signal is subjected to phase modulation with the modulation depth $\Delta\phi_{p-p}$ described above. At step 1004, the phase modulated optical signal is subjected to a time delay of $$\frac{T}{2}-\tau$$

on its input signal, where T is the desired pulse period and τ is computed as described above, based on the value of T and the frequency of the optical signal source.

Figure 11:
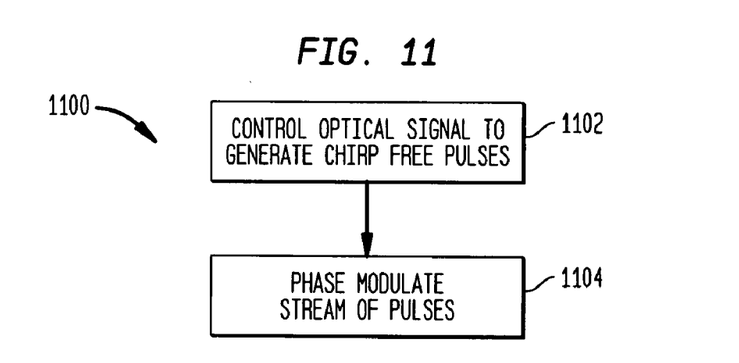
FIG. 11 illustrates a further alternative process of pulse generation according to an alternative aspect of the present invention.

FIG. 11 illustrates a process 1100 of progressive phase shift pulse generation, according to an aspect of the present invention. The process 1100 may suitably be employed to accomplish the pulse generation achieved in the step 804 of the process 800 discussed above.

At step 1102, an optical signal is controlled by an electrical input signal to generate chirp free pulses. The optical signal is preferably produced by a continuous wave laser and the electrical input signal produces a stream of chirp free pulses, with the pulses preferably having a duty cycle of approximately 33%. Modulation of the optical signal may suitably be accomplished by supplying the optical signal to a Mach-Zehnder modulator differentially driven with a sinusoidal driver signal having a frequency equal to one half the pulse rate.

At step 1104, the stream of chirp free pulses is then phase modulated. The phase modulation is suitably chosen to produce a pulse train having a duty cycle of approximately 33% and exhibiting a progressive phase shift of approximately $$\frac{\pi}{2}.$$

While the present invention has been disclosed in the context of various aspects of presently preferred embodiments, it will be recognized that the invention may be suitably applied to other environments consistent with the claims which follow.

We claim:

1. A pulse generator for generating optical pulses, comprising:
    an input waveguide for receiving an optical input signal;
    a pulse modulator for modulating the optical input signal to generate a stream of pulses, each pulse exhibiting a frequency shift at the center of the pulse with respect to the frequency of the optical input signal; and
    an output waveguide for conveying the stream of pulses to a destination.

2. The pulse generator of claim 1, wherein the pulse modulator performs modulation on the optical input signal such that the pulses exhibit a progressive phase shift with respect to the center frequency of the pulses.

3. The pulse generator of claim 2, wherein the pulse modulator is a dual-drive Mach-Zehnder modulator, differentially driven by two sinusoidal electrical input signals, and wherein the electrical input signals are shifted in time by an amount based on the desired frequency shift of the pulses.

4. The pulse generator of claim 3, wherein the frequencies of the electrical input signals are $$\frac{1}{T},$$

where T is the desired pulse period.

5. The pulse generator of claim 4, wherein the optical input signal is modulated such that the instantaneous frequency shift at the center of the pulses is approximately $$\frac{1}{4T}$$

and the progressive phase shift of the pulses is $$\frac{\pi}{2}.$$

6. The pulse generator of claim 5, wherein the two sinusoidal electrical input signals are shifted in phase or time by approximately 0.1 T.

7. The pulse generator of claim 6, wherein a DC bias is applied to the Mach-Zehnder modulator such that the output pulses have a duty cycle of approximately 50% and a substantially infinite extinction ratio.

8. The pulse generator of claim 7, wherein the pulses produced by the pulse generator have a pulse repetition rate of approximately 40 gigahertz.

9. The pulse generator of claim 1, wherein the pulse modulator comprises a phase modulator for phase modulating the optical input signal to produce a modulated signal and an optical delay interferometer for imposing a time delay on the modulated signal, the phase modulation and the time delay being chosen to produce a stream of pulses exhibiting a progressive phase shift between adjacent pulses.

10. The pulse generator of claim 9, wherein the modulation depth imposed by the phase modulator is $$\frac{\pi}{2\cos\frac{\Omega\tau}{2}},$$

where the value of $\Omega$ is based on the desired pulse period and follows the relationship $$\frac{\Omega}{2\pi} = \frac{1}{T},$$

where T is the pulse period and wherein the value of $\tau$ is based on a value of a desired frequency shift at the center of each pulse, wherein the value of the frequency shift is defined by the relationship $$\Delta\omega = -\frac{\partial\phi(t)}{\partial t}\bigg|_{t=2N\pi} = \frac{\pi}{4}\Omega\tan\frac{\Omega\tau}{2},$$

wherein $\omega$ is the frequency of the optical input signal, and wherein the time delay imposed by the optical delay interferometer is $$\frac{T}{2} - \tau.$$

11. The pulse generator of claim 1, wherein the pulse modulator comprises a chirp free pulse generator for generating chirp free pulses based on an optical input signal and a phase modulator for imposing a phase modulation on the chirp free optical pulses so as to produce optical pulses exhibiting a progressive phase shift.

12. The progressive phase shifted pulse generator of claim 11, wherein the chirp free pulse generator produces pulses having a duty cycle of approximately 33% and wherein the chirp free pulse generator comprises a Mach-Zehnder modulator driven by electrical signals having a frequency of $$\frac{1}{2T},$$

where T is the desired pulse period of pulses to be produced by the progressive phase shift pulse generator.

13. A transmitter for transmitting binary data by means of an optical signal, comprising:
    a pulse generator for generating a stream of progressively phase shifted pulses, each pulse exhibiting a frequency shift at the center of the pulse with respect to the frequency of the optical input signal; and
    a data modulator for receiving the stream of pulses from the pulse generator and using an electrical signal to modulate depending on the binary data to be transmitted.

14. The transmitter of claim 13, wherein the data modulator imposes a phase shift between adjacent pulses depending on the binary data to be transmitted.

15. The transmitter of claim 14, wherein the pulses produced by the pulse generator exhibit a progressive phase shift of $$\frac{\pi}{2}$$

and wherein the data modulator provides a phase modulation of $\pi$ or $-\pi$ or depending on the data to be transmitted such that the phase shift between the pulses produced by the transmitter is $$\frac{\pi}{2} \text{ or } -\frac{\pi}{2}$$

depending on the data to be transmitted.

16. The transmitter of claim 13, wherein the data modulator provides an on-off keying modulation, with the pulse stream from the pulse generator being blocked or passed depending on the binary data to be transmitted, so as to produce vestigial sideband pulses depending on the binary data to be transmitted.

17. A method of optical pulse generation, comprising the steps of:
    modulating an optical input signal so as to produce a stream of optical pulses exhibiting a progressive phase shift between adjacent pulses; and
    modulating the optical pulses with electrical signals representing data to be transmitted.

18. The method of claim 17, wherein the step of modulating the optical signal includes modulating the signal so as to produce a frequency shift at the center of each of the optical pulses with respect to the frequency of the optical input signal.

19. The method of claim 18, wherein the step of modulating the optical signal comprises:
    supplying an optical signal to an input waveguide of a Mach-Zehnder modulator so that the signal travels along an input waveguide, is split between a first and a second parallel waveguide and recombines in an output waveguide such that the signals traveling in the first and second waveguides interfere with one another to create a pulse stream;

supplying a DC bias current to the first and second parallel waveguides of the modulator; and supplying an electrical signal to each of the waveguides, the two electrical signals exhibiting a relative timing skew chosen to produce a predetermined frequency shift in pulses to be produced by the pulse generator, the timing skew being further based on the period of the pulses to be produced by the pulse generator and chosen so as to produce a progressive phase shift between pairs of adjacent pulses.

20. The method of claim 19, wherein the step of modulating the optical signal to produce the stream of optical pulses is performed such that the progressive phase shift between adjacent pulses is $$\frac{\pi}{2}.$$

21. The method of claim 20, wherein the step of modulating the optical pulses with electrical signals includes performing differential phase shift keying on the pulse stream such that the difference in phase between adjacent pulses is $$\frac{\pi}{2} \text{ or } -\frac{\pi}{2}$$

depending on the data to be transmitted.

22. The method of claim 21, wherein step of modulating the optical pulses with electrical signals includes performing on-off keying on the pulse stream such that the data is transmitted by vestigial sideband pulses.

* * * * *